US 11,785,657 B2

(12) United States Patent
He

(10) Patent No.: US 11,785,657 B2
(45) Date of Patent: Oct. 10, 2023

(54) UE ASSISTANCE INFORMATION FOR DUAL CONNECTIVITY

(71) Applicant: QUALCOMM Incorporated, San Diego, CA (US)

(72) Inventor: Linhai He, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 42 days.

(21) Appl. No.: 17/170,081

(22) Filed: Feb. 8, 2021

(65) Prior Publication Data

US 2021/0266997 A1 Aug. 26, 2021

Related U.S. Application Data

(60) Provisional application No. 62/980,997, filed on Feb. 24, 2020.

(51) Int. Cl.
*H04W 76/15* (2018.01)
*H04W 76/27* (2018.01)
*H04W 52/02* (2009.01)

(52) U.S. Cl.
CPC ....... *H04W 76/15* (2018.02); *H04W 52/0225* (2013.01); *H04W 76/27* (2018.02)

(58) Field of Classification Search
CPC . H04W 76/15; H04W 76/27; H04W 52/0225; H04W 76/16; H04W 52/02; H04W 76/20; H04W 76/10; H04L 69/14
See application file for complete search history.

(56) References Cited

U.S. PATENT DOCUMENTS

| 2013/0229964 | A1* | 9/2013 | Chakravarthy ... | H04W 52/0212 370/311 |
| 2015/0334656 | A1* | 11/2015 | Ji ..................... | H04W 52/0245 370/252 |
| 2016/0295499 | A1* | 10/2016 | Tavildar ............... | H04W 48/12 |
| 2017/0289910 | A1* | 10/2017 | Islam ................ | H04W 52/0216 |
| 2018/0020382 | A1* | 1/2018 | Kim ..................... | H04L 1/1819 |
| 2018/0049214 | A1* | 2/2018 | Kubota ................. | H04W 36/04 |
| 2018/0376438 | A1* | 12/2018 | Islam .................. | H04W 56/001 |
| 2019/0045404 | A1 | 2/2019 | Tsai et al. | |
| 2019/0254104 | A1* | 8/2019 | Gurumoorthy ....... | H04W 76/27 |
| 2019/0342148 | A1* | 11/2019 | Hong ................ | H04W 28/0252 |

(Continued)

FOREIGN PATENT DOCUMENTS

WO WO-2020027616 A1 * 2/2020 ............. H04W 4/14

OTHER PUBLICATIONS

"UE overheating for EN-DC. Athens, Greece, Feb. 26-Mar. 2, 2018" (Year: 2018).*

(Continued)

*Primary Examiner* — Mewale A Ambaye
(74) *Attorney, Agent, or Firm* — Patterson + Sheridan, LLP

(57) ABSTRACT

Certain aspects of the present disclosure provide a technique for signaling user equipment (UE) assistance information (UAI) that is specific to a particular cell group (CG) (e.g., a secondary CG (SCG)). For example, the technique may be executed to generate CG specific UAI, which may indicate a configuration parameter for the UE when operating in a multiple radio dual connectivity (MR-DC) mode. The UE may signal the UAI to a network entity along with an indication of the CG to which the UAI is to be applied.

26 Claims, 12 Drawing Sheets

(56) References Cited

U.S. PATENT DOCUMENTS

| | | | | |
|---|---|---|---|---|
| 2020/0163144 | A1* | 5/2020 | Ryoo | H04W 76/30 |
| 2021/0051749 | A1* | 2/2021 | Adusumilli | H04W 76/27 |
| 2021/0105681 | A1* | 4/2021 | Paladugu | H04W 36/00837 |
| 2021/0143895 | A1* | 5/2021 | Kim | H04W 4/40 |
| 2021/0194763 | A1* | 6/2021 | Abedini | H04L 41/0654 |
| 2021/0329473 | A1* | 10/2021 | Zhang | H04W 24/10 |
| 2022/0116840 | A1* | 4/2022 | Purkayastha | H04W 36/00837 |

OTHER PUBLICATIONS

International Search Report and Written Opinion—PCT/US2021/017248—ISA/EPO—dated May 21, 2021.

* cited by examiner

US 11,785,657 B2

UE ASSISTANCE INFORMATION FOR DUAL CONNECTIVITY

CROSS-REFERENCE TO RELATED APPLICATION

This application claims benefit of and priority to U.S. Provisional Patent Application No. 62/980,997, filed Feb. 24, 2020, which is hereby incorporated by reference in its entirety.

BACKGROUND

Field of the Disclosure

Aspects of the present disclosure relate to wireless communications, and more particularly, to techniques for signaling user equipment (UE) assistance information (UAI) that is specific to a particular cell group (CG).

Description of Related Art

Wireless communication systems are widely deployed to provide various telecommunication services such as telephony, video, data, messaging, broadcasts, etc. These wireless communication systems may employ multiple-access technologies capable of supporting communication with multiple users by sharing available system resources (e.g., bandwidth, transmit power, etc.). Examples of such multiple-access systems include 3rd Generation Partnership Project (3GPP) Long Term Evolution (LTE) systems, LTE Advanced (LTE-A) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems, to name a few.

In some examples, a wireless multiple-access communication system may include a number of base stations (BSs), which are each capable of simultaneously supporting communication for multiple communication devices, otherwise known as user equipments (UEs). In an LTE or LTE-A network, a set of one or more base stations may define an eNodeB (eNB). In other examples (e.g., in a next generation, a new radio (NR), or 5G network), a wireless multiple access communication system may include a number of distributed units (DUs) (e.g., edge units (EUs), edge nodes (ENs), radio heads (RHs), smart radio heads (SRHs), transmission reception points (TRPs), etc.) in communication with a number of central units (CUs) (e.g., central nodes (CNs), access node controllers (ANCs), etc.), where a set of one or more distributed units, in communication with a central unit, may define an access node (e.g., which may be referred to as a base station, 5G NB, next generation NodeB (gNB or gNodeB), TRP, etc.). A base station (BS) or distributed unit may communicate with a set of UEs on downlink (DL) channels (e.g., for transmissions from a base station or to a UE) and uplink (UL) channels (e.g., for transmissions from a UE to a BS or DU).

These multiple access technologies have been adopted in various telecommunication standards to provide a common protocol that enables different wireless devices to communicate on a municipal, national, regional, and even global level. New Radio (NR) (e.g., $5^{th}$ generation (5G)) is an example of an emerging telecommunication standard. NR is a set of enhancements to the LTE mobile standard promulgated by 3GPP. It is designed to better support mobile broadband Internet access by improving spectral efficiency, lowering costs, improving services, making use of new spectrum, and better integrating with other open standards using OFDMA with a cyclic prefix (CP) on a DL and on an UL. To these ends, NR supports beamforming, multiple-input multiple-output (MIMO) antenna technology, and carrier aggregation.

However, as the demand for mobile broadband access continues to increase, there exists a need for further improvements in NR and LTE technology. Preferably, these improvements should be applicable to other multi-access technologies and the telecommunication standards that employ these technologies.

BRIEF SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "Detailed Description" one will understand how the features of this disclosure provide advantages that include improved and desirable communications between a base station (BS) and a user equipment (UE) in a wireless network.

Certain aspects provide a method of wireless communications by a UE. The method generally includes generating cell group (CG) specific UE assistance information (UAI), indicating at least one configuration parameter for the UE when operating in a multiple radio dual connectivity (MR-DC) mode and signaling the UAI to a network entity, with an indication of a CG to which the UAI is to be applied.

Certain aspects provide a method of wireless communications by a network entity. The method generally includes receiving, from a UE, CG specific UAI, indicating at least one configuration parameter for the UE when operating in a MR-DC mode, determining to which CG the UAI is to be applied, and applying the UAI in accordance with the determination.

Certain aspects provide an apparatus for wireless communications. The apparatus generally includes at least one processor and a memory configured to: generate CG specific UAI, indicating at least one configuration parameter for a UE when operating in a MR-DC mode; and signal the UAI to a network entity, with an indication of a CG to which the UAI is to be applied.

Certain aspects provide an apparatus for wireless communications. The apparatus generally includes at least one processor and a memory configured to: receive, from a UE, CG specific UAI, indicating at least one configuration parameter for the UE when operating in a MR-DC mode; determine to which CG the UAI is to be applied; and apply the UAI in accordance with the determination.

Certain aspects provide an apparatus for wireless communications. The apparatus generally includes means for generating CG specific UAI, indicating at least one configuration parameter for a UE when operating in a MR-DC mode and means for signaling the UAI to a network entity, with an indication of a CG to which the UAI is to be applied.

Certain aspects provide an apparatus for wireless communications. The apparatus generally includes means for receiving, from a UE, CG specific UAI, indicating at least one configuration parameter for the UE when operating in a MR-DC mode, means for determining to which CG the UAI is to be applied, and means for applying the UAI in accordance with the determination.

Certain aspects of the subject matter described in this disclosure can be implemented in a computer readable medium storing computer executable code thereon for wireless communications. The computer readable medium comprises code for generating CG specific UAI, indicating at least one configuration parameter for a UE when operating in a MR-DC mode and code for signaling the UAI to a network entity, with an indication of a CG to which the UAI is to be applied.

Certain aspects of the subject matter described in this disclosure can be implemented in a computer readable medium storing computer executable code thereon for wireless communications. The computer readable medium comprises code for receiving, from a UE, CG specific UAI, indicating at least one configuration parameter for the UE when operating in a MR-DC mode, code for determining to which CG the UAI is to be applied, and code for applying the UAI in accordance with the determination.

To the accomplishment of the foregoing and related ends, the one or more aspects comprise the features hereinafter fully described and particularly pointed out in the claims. The following description and the appended drawings set forth in detail certain illustrative features of the one or more aspects. These features are indicative, however, of but a few of the various ways in which the principles of various aspects may be employed.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the drawings. It is to be noted, however, that the appended drawings illustrate only certain typical aspects of this disclosure and are therefore not to be considered limiting of its scope, for the description may admit to other equally effective aspects.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Figure 1:
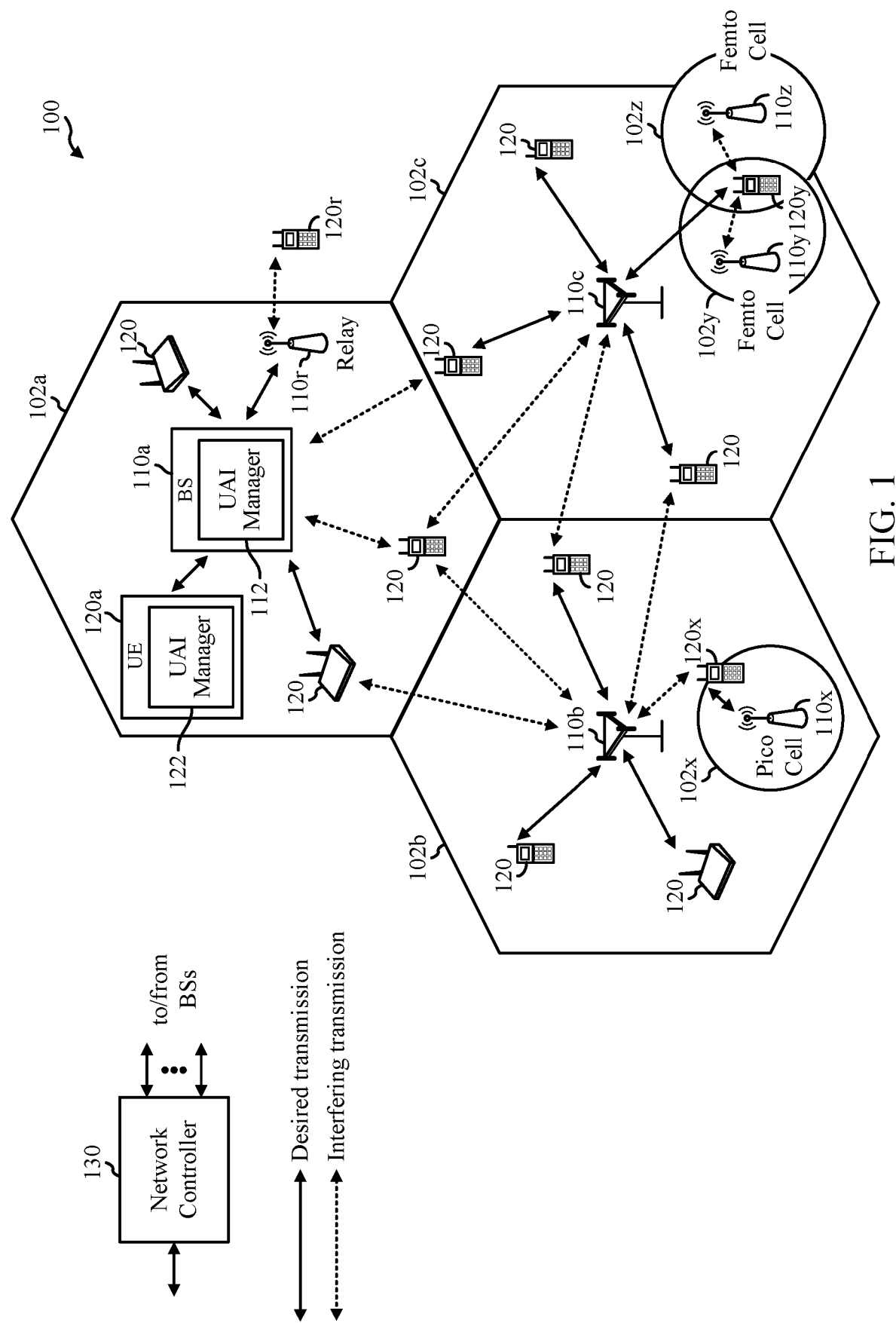
FIG. 1 is a block diagram conceptually illustrating an example telecommunications system, in accordance with certain aspects of the present disclosure.

Aspects of the present disclosure provide apparatuses, methods, processing systems, and computer readable mediums for providing particular cell group (CG) (e.g., a secondary CG (SCG)) specific user equipment (UE) assistance information (UAI) to a network entity. For example, a UE may execute a technique to generate CG specific UAI, which may indicate a configuration parameter for the UE when operating in a multiple radio dual connectivity (MR-DC) mode. The UE may signal the UAI to the network entity along with an indication of the CG to which the UAI is to be applied.

The following description provides examples of providing CG specific UAI for power saving in wireless communication systems. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method which is practiced using other structure, functionality, or structure and functionality in addition to, or other than, the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over other aspects.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a subcarrier, a frequency channel, a tone, a subband, etc. Each frequency may support a single RAT in a given geographic area in order to avoid interference between wireless networks of different RATs.

The techniques described herein may be used for various wireless communication technologies, such as long term evolution (LTE), code division multiple access (CDMA), time division multiple access (TDMA), frequency division multiple access (FDMA), orthogonal frequency division multiple access (OFDMA), single-carrier frequency division multiple access (SC-FDMA) and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as new radio (NR) (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS).

NR is an emerging wireless communications technology under development in conjunction with the 5G Technology Forum (5GTF). 3GPP LTE and LTE-Advanced (LTE-A) are releases of the UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). The techniques described herein may be used for the wireless networks and radio technologies mentioned above as well as other wireless networks and radio technologies. For clarity, while aspects may be described herein using terminology commonly associated with 3G and/or 4G wireless technologies, aspects of the present disclosure can be applied in other generation-based communication systems, such as 5G and later, including NR technologies.

NR access (e.g., 5G technology) may support various wireless communication services, such as enhanced mobile broadband (eMBB) targeting wide bandwidth (e.g., 80 MHz or beyond), millimeter wave (mmW) targeting high carrier frequency (e.g., 25 GHz or beyond), massive machine type communications MTC (mMTC) targeting non-backward compatible MTC techniques, and/or mission critical targeting ultra-reliable low-latency communications (URLLC). These services may include latency and reliability requirements. These services may also have different transmission time intervals (TTI) to meet respective quality of service (QoS) requirements. In addition, these services may co-exist in the same subframe.

The electromagnetic spectrum is often subdivided, based on frequency/wavelength, into various classes, bands, channels, etc. In 5G NR two initial operating bands have been identified as frequency range designations FR1 (410 MHz-7.125 GHz) and FR2 (24.25 GHz-52.6 GHz). The frequencies between FR1 and FR2 are often referred to as mid-band frequencies. Although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, or may be within the EHF band.

NR supports beamforming and beam direction may be dynamically configured. Multiple input multiple output (MIMO) transmissions with precoding may also be supported. MIMO configurations in a downlink (DL) may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells.

Example Wireless Communications System

FIG. 1 illustrates an example wireless communication network 100 in which aspects of the present disclosure may be performed. For example, according to certain aspects, the wireless communication network 100 may include base stations (BSs) 110 and/or user equipments (UEs) 120 configured for providing cell group (CG) specific UE assistance information (UAI). As shown in FIG. 1, a UE 120a includes a UAI manager 122 to generate and signal UAI in accordance with operations 800 of FIG. 8. ABS 110a includes a UAI manager 112, which may be configured to perform operations 900 of FIG. 9 to receive and process UAI (provided by the UE performing operations 800 of FIG. 8).

The wireless communication network 100 may be a new radio (NR) system (e.g., a $5^{th}$ generation (5G) NR network). As shown in FIG. 1, the wireless communication network 100 may be in communication with a core network. The core network may in communication with BSs 110a-z (each also individually referred to herein as a BS 110 or collectively as BSs 110) and/or UEs 120a-y (each also individually referred to herein as a UE 120 or collectively as UEs 120) in the wireless communication network 100 via one or more interfaces.

As illustrated in FIG. 1, the wireless network 100 may include a number of BSs 110 and other network entities. A BS 110 may be a station that communicates with UEs. Each BS 110 may provide communication coverage for a particular geographic area. In 3GPP, the term "cell" can refer to a coverage area of a Node B (NB) and/or a Node B subsystem serving this coverage area, depending on the context in which the term is used. In NR systems, the term "cell" and next generation NodeB (gNB), NR BS, 5G NB, access point (AP), or transmission reception point (TRP) may be interchangeable. In some examples, a cell may not necessarily be stationary, and the geographic area of the cell may move according to the location of a mobile BS 110. In some examples, the base stations may be interconnected to one another and/or to one or more other base stations or network nodes (not shown) in wireless communication network 100 through various types of backhaul interfaces, such as a direct physical connection, a wireless connection, a virtual network, or the like using any suitable transport network.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a subcarrier, a frequency channel, a tone, a subband, etc. Each frequency may support a single RAT in a given geographic area in order to avoid interference between wireless networks of different RATs. In some cases, NR or 5G RAT networks may be deployed.

A BS may provide communication coverage for a macro cell, a pico cell, a femto cell, and/or other types of cells. A macro cell may cover a relatively large geographic area (e.g., several kilometers in radius) and may allow unrestricted access by the UEs 120 with service subscription. A pico cell may cover a relatively small geographic area and may allow unrestricted access by the UEs 120 with service subscription. A femto cell may cover a relatively small geographic area (e.g., a home) and may allow restricted access by the UEs 120 having an association with the femto cell (e.g., UEs 120 in a Closed Subscriber Group (CSG), the UEs 120 for users in the home, etc.). A BS 110 for a macro cell may be referred to as a macro BS. A BS 110 for a pico cell may be referred to as a pico BS. A BS 110 for a femto cell may be referred to as a femto BS or a home BS. In the example shown in FIG. 1, the BSs 110a, 110b and 110c may be macro BSs for the macro cells 102a, 102b and 102c, respectively. The BS 110x may be a pico BS for a pico cell 102x. The BSs 110y and 110z may be femto BSs for the femto cells 102y and 102z, respectively. A BS 110 may support one or multiple (e.g., three) cells.

The wireless communication network 100 may also include relay stations. A relay station is a station that receives a transmission of data and/or other information from an upstream station (e.g., a BS 110 or a UE 120) and sends a transmission of the data and/or other information to a downstream station (e.g., a UE 120 or a BS 110). A relay station may also be a UE 120 that relays transmissions for other UEs 120. In the example shown in FIG. 1, a relay station 110r may communicate with the BS 110a and a UE 120r in order to facilitate communication between the BS 110a and the UE 120r. A relay station may also be referred to as a relay BS, a relay, etc.

The wireless communication network 100 may be a heterogeneous network that includes BSs 110 of different types, e.g., macro BS, pico BS, femto BS, relays, etc. These different types of BSs 110 may have different transmit power levels, different coverage areas, and different impact on interference in the wireless communication network 100. For example, macro BS may have a high transmit power level (e.g., 20 Watts) whereas pico BS, femto BS, and relays may have a lower transmit power level (e.g., 1 Watt).

The wireless communication network 100 may support synchronous or asynchronous operation. For synchronous operation, the BSs 110 may have similar frame timing, and transmissions from different BSs may be approximately aligned in time. For asynchronous operation, the BSs 110 may have different frame timing, and transmissions from different BSs 110 may not be aligned in time. The techniques described herein may be used for both synchronous and asynchronous operation.

A network controller 130 may couple to a set of BSs 110 and provide coordination and control for these BSs 110. The network controller 130 may communicate with the BSs 110 via a backhaul. The BSs 110 may also communicate with one another (e.g., directly or indirectly) via wireless or wireline backhaul.

The UEs 120 (e.g., 120x, 120y, etc.) may be dispersed throughout the wireless communication network 100, and each UE 120 may be stationary or mobile. A UE may also be referred to as a mobile station, a terminal, an access terminal, a subscriber unit, a station, a customer premises equipment (CPE), a cellular phone, a smart phone, a personal digital assistant (PDA), a wireless modem, a wireless communication device, a handheld device, a laptop computer, a cordless phone, a wireless local loop (WLL) station, a tablet computer, a camera, a gaming device, a netbook, a smartbook, an ultrabook, an appliance, a medical device or medical equipment, a biometric sensor/device, a wearable device such as a smart watch, smart clothing, smart glasses, a smart wrist band, smart jewelry (e.g., a smart ring, a smart bracelet, etc.), an entertainment device (e.g., a music device, a video device, a satellite radio, etc.), a vehicular component or sensor, a smart meter/sensor, industrial manufacturing equipment, a global positioning system device, or any other suitable device that is configured to communicate via a wireless or wired medium. Some UEs may be considered machine-type communication (MTC) devices or evolved MTC (eMTC) devices. MTC and eMTC UEs include, for example, robots, drones, remote devices, sensors, meters, monitors, location tags, etc., that may communicate with a BS, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, which may be narrowband IoT (NB-IoT) devices.

Certain wireless networks (e.g., LTE) utilize orthogonal frequency division multiplexing (OFDM) on a downlink (DL) and single-carrier frequency division multiplexing (SC-FDM) on an uplink (UL). OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (called a "resource block" (RB)) may be 12 subcarriers (or 180 kHz). Consequently, the nominal Fast Fourier Transfer (FFT) size may be equal to 128, 256, 512, 1024 or 2048 for system bandwidth of 1.25, 2.5, 5, 10, or 20 megahertz (MHz), respectively. The system bandwidth may also be partitioned into subbands. For example, a subband may cover 1.8 MHz (i.e., 6 resource blocks), and there may be 1, 2, 4, 8, or 16 subbands for system bandwidth of 1.25, 2.5, 5, 10 or 20 MHz, respectively.

While aspects of the examples described herein may be associated with LTE technologies, aspects of the present disclosure may be applicable with other wireless communications systems, such as NR. NR may utilize OFDM with a cyclic prefix (CP) on the UL and the DL and include support for half-duplex operation using TDD. Beamforming may be supported and beam direction may be dynamically configured. Multiple input multiple output (MIMO) transmissions with precoding may also be supported. MIMO configurations in the DL may support up to 8 transmit antennas with multi-layer DL transmissions up to 8 streams and up to 2 streams per UE. Aggregation of multiple cells may be supported with up to 8 serving cells.

In some examples, access to the air interface may be scheduled, wherein a scheduling entity (e.g., a BS 110) allocates resources for communication among some or all devices and equipment within its service area or cell. The scheduling entity may be responsible for scheduling, assigning, reconfiguring, and releasing resources for one or more subordinate entities. That is, for scheduled communication, subordinate entities utilize resources allocated by the scheduling entity. BSs 110 are not the only entities that may function as a scheduling entity. In some examples, a UE 120 may function as a scheduling entity and may schedule resources for one or more subordinate entities (e.g., one or more other UEs 120), and the other UEs 120 may utilize the resources scheduled by the UE 120 for wireless communication. In some examples, a UE 120 may function as a scheduling entity in a peer-to-peer (P2P) network, and/or in a mesh network. In a mesh network example, UEs 120 may communicate directly with one another in addition to communicating with a scheduling entity.

In FIG. 1, a solid line with double arrows indicates desired transmissions between a UE 120 and a serving BS 110, which is a BS 110 designated to serve the UE 120 on the DL and/or the UL. A finely dashed line with double arrows indicates interfering transmissions between a UE 120 and a BS 110.

Figure 2:
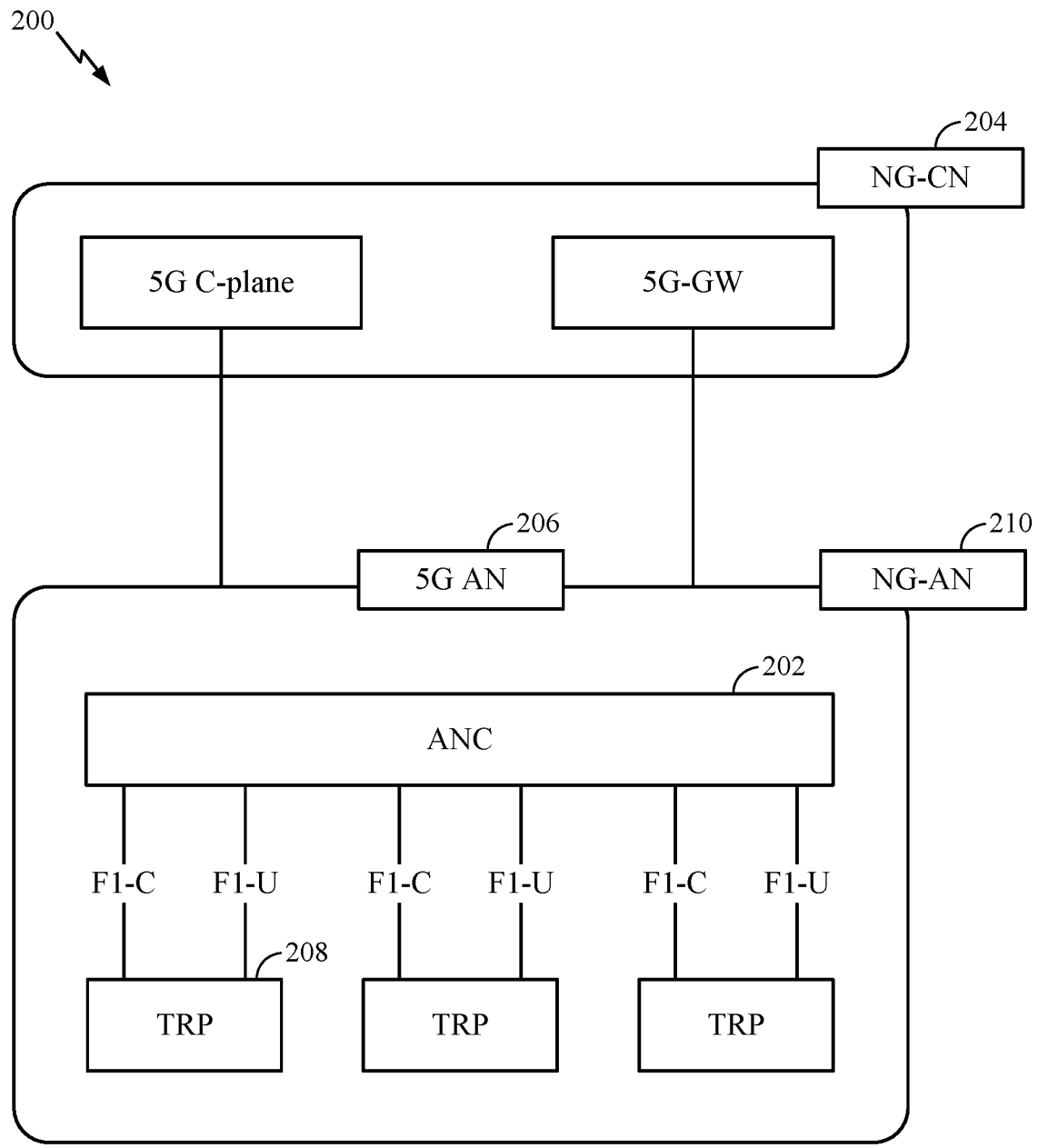
FIG. 2 is a block diagram illustrating an example logical architecture of a distributed radio access network (RAN), in accordance with certain aspects of the present disclosure.

FIG. 2 illustrates an example logical architecture of a distributed radio access network (RAN) 200, which may be implemented in the wireless communication network 100 illustrated in FIG. 1. A 5G access node 206 may include an access node controller (ANC) 202. The ANC 202 may be a central unit (CU) of the distributed RAN 200. A backhaul interface to the Next Generation Core Network (NG-CN) 204 may terminate at the ANC 202. The backhaul interface to neighboring next generation access Nodes (NG-ANs) 210 may terminate at the ANC 202. The ANC 202 may include one or more TRPs 208 (e.g., cells, BSs, gNBs, etc.).

The TRPs 208 may be a distributed unit (DU). The TRPs 208 may be connected to a single ANC (e.g., ANC 202) or more than one ANC (not illustrated). For example, for RAN sharing, radio as a service (RaaS), and service specific AND deployments, the TRPs 208 may be connected to more than one ANC. The TRPs 208 may each include one or more antenna ports. The TRPs 208 may be configured to individually (e.g., dynamic selection) or jointly (e.g., joint transmission) serve traffic to a UE.

The logical architecture of the distributed RAN 200 may support fronthauling solutions across different deployment types. For example, the logical architecture may be based on transmit network capabilities (e.g., bandwidth, latency, and/or jitter).

The logical architecture of the distributed RAN 200 may share features and/or components with LTE. For example, next generation access node (NG-AN) 210 may support dual connectivity with NR and may share a common fronthaul for LTE and NR.

The logical architecture of the distributed RAN 200 may enable cooperation between and among TRPs 208, for example, within a TRP and/or across TRPs via ANC 202. An inter-TRP interface may not be used.

Logical functions may be dynamically distributed in the logical architecture of the distributed RAN 200. As will be described in more detail with reference to FIG. 5, a radio resource control (RRC) layer, a packet data convergence protocol (PDCP) layer, a radio link control (RLC) layer, a medium access control (MAC) layer, and physical (PHY) layers may be adaptably placed at the DU (e.g., TRP 208) or CU (e.g., ANC 202).

Figure 3:
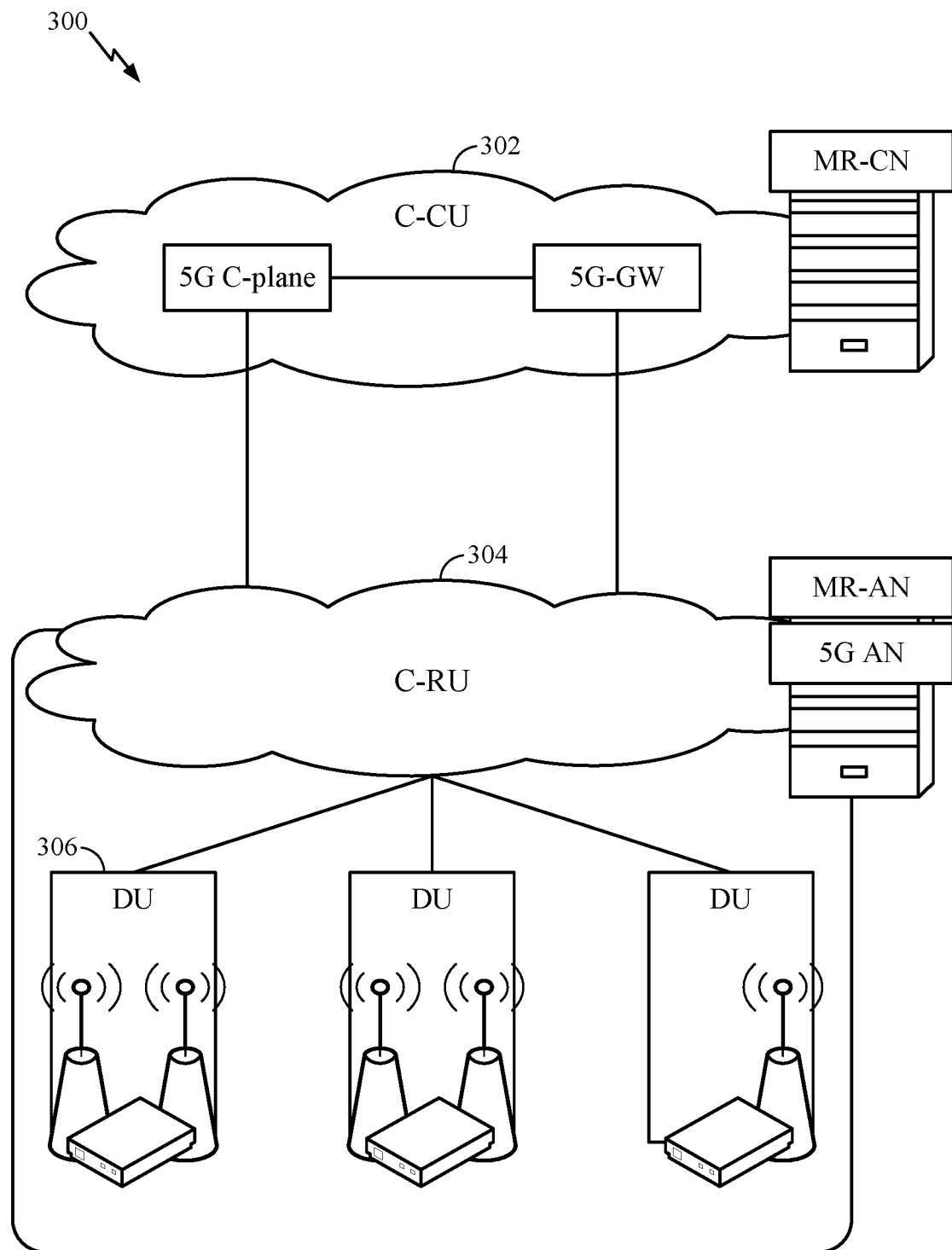
FIG. 3 is a diagram illustrating an example physical architecture of a distributed RAN, in accordance with certain aspects of the present disclosure.

FIG. 3 illustrates an example physical architecture of a distributed radio access network (RAN) 300, according to aspects of the present disclosure. A centralized core network unit (C-CU) 302 may host core network functions. The C-CU 302 may be centrally deployed. The C-CU 302 functionality may be offloaded (e.g., to advanced wireless services (AWS)), in an effort to handle peak capacity.

A centralized RAN unit (C-RU) 304 may host one or more ANC functions. Optionally, the C-RU 304 may host core network functions locally. The C-RU 304 may have distributed deployment. The C-RU 304 may be close to a network edge.

A DU 306 may host one or more TRPs (edge node (EN), an edge unit (EU), a radio head (RH), a smart radio head (SRH), or the like). The DU 306 may be located at edges of the network with radio frequency (RF) functionality.

Figure 4:
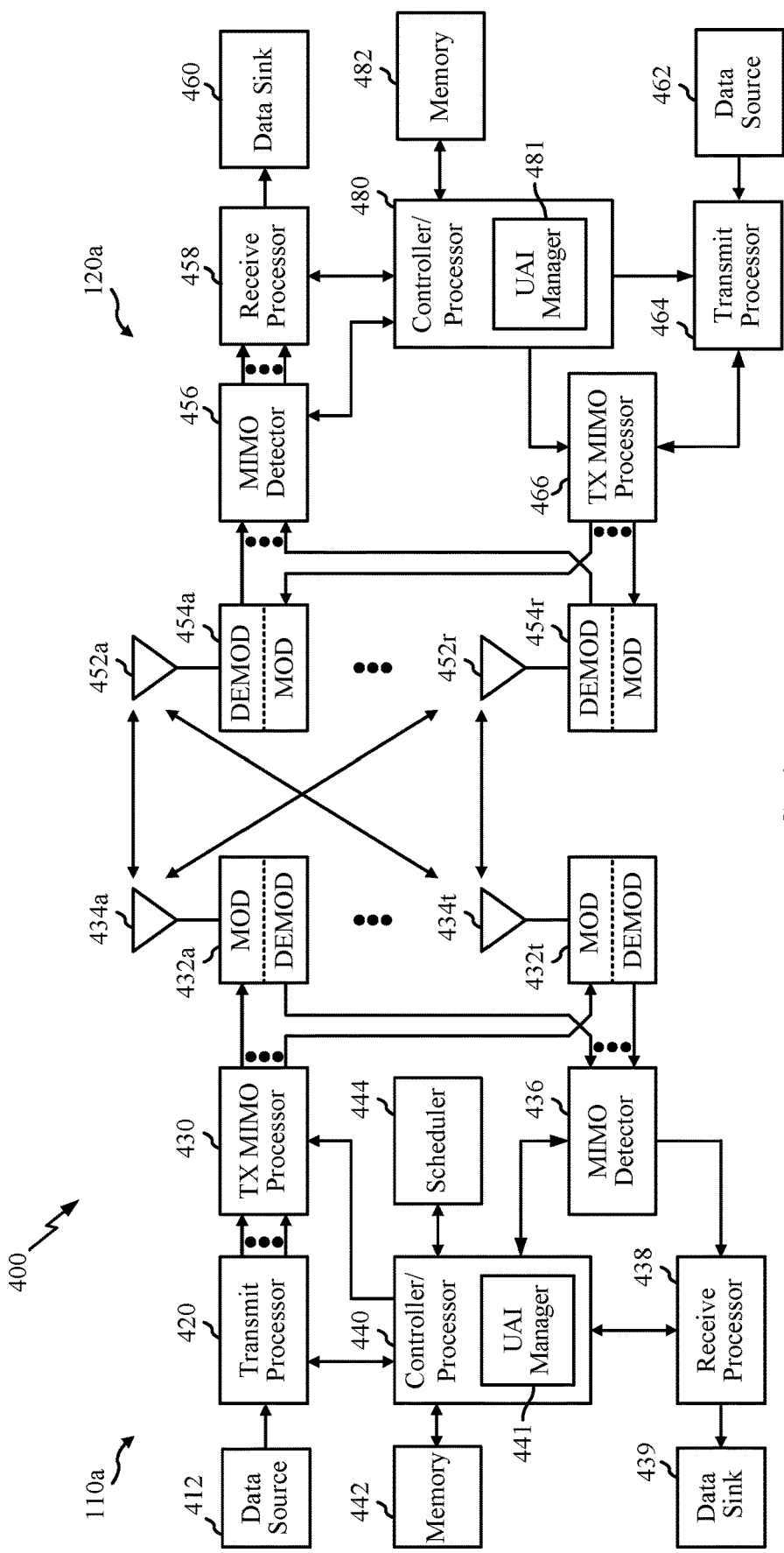
FIG. 4 is a block diagram conceptually illustrating a design of an example base station (B S) and user equipment (UE), in accordance with certain aspects of the present disclosure.

FIG. 4 illustrates example components of a BS 110a and a UE 120a (e.g., in the wireless communication network 100 of FIG. 1).

At the BS 110a, a transmit processor 420 may receive data from a data source 412 and control information from a controller/processor 440. The control information may be for the physical broadcast channel (PBCH), physical control format indicator channel (PCFICH), physical hybrid ARQ indicator channel (PHICH), physical downlink control channel (PDCCH), group common PDCCH (GC PDCCH), etc. The data may be for the physical downlink shared channel (PDSCH), etc. A medium access control (MAC)-control element (MAC-CE) is a MAC layer communication structure that may be used for control command exchange between wireless nodes. The MAC-CE may be carried in a shared channel such as a physical downlink shared channel (PDSCH), a physical uplink shared channel (PUSCH), or a physical sidelink shared channel (PSSCH).

The transmit processor 420 may process (e.g., encode and symbol map) the data and control information to obtain data symbols and control symbols, respectively. The processor 420 may also generate reference symbols, e.g., for the primary synchronization signal (PSS), secondary synchronization signal (SSS), and cell-specific reference signal (CRS). A transmit MIMO processor 430 may perform spatial processing (e.g., precoding) on the data symbols, the control symbols, and/or the reference symbols, if applicable, and may provide output symbol streams to modulators (MODs) in transceivers 432a through 432t. Each MOD in transceivers 432 may process a respective output symbol stream (e.g., for OFDM, etc.) to obtain an output sample stream. Each MOD in transceivers 432 may further process (e.g., convert to analog, amplify, filter, and upconvert) the output sample stream to obtain a DL signal. The DL signals from the MODs in transceivers 432a through 432t may be transmitted via antennas 434a through 434t, respectively.

At the UE 120a, antennas 452a through 452r may receive the DL signals from the BS 110 and may provide received signals to the demodulators (DEMODs) in transceivers (or receivers) 454a through 454r, respectively. Each DEMOD in the transceiver 454 may condition (e.g., filter, amplify, downconvert, and digitize) a respective received signal to obtain input samples. Each DEMOD in the transceiver 454 may further process the input samples (e.g., for OFDM, etc.) to obtain received symbols. A MIMO detector 456 may obtain received symbols from all the DEMODs in the transceivers 454a through 454r, perform MIMO detection on the received symbols if applicable, and provide detected symbols. A receive processor 458 may process (e.g., demodulate, deinterleave, and decode) the detected symbols, provide decoded data for the UE 120 to a data sink 460, and provide decoded control information to a controller/processor 480.

On the UL, at UE 120a, a transmit processor 464 may receive and process data (e.g., for the physical uplink shared channel (PUSCH)) from a data source 462 and control information (e.g., for the physical uplink control channel (PUCCH) from the controller/processor 480. The transmit processor 464 may also generate reference symbols for a reference signal (e.g., for the sounding reference signal (SRS)). The symbols from the transmit processor 464 may be precoded by a transmit MIMO processor 466 if applicable, further processed by the DEMODs in transceivers 454a through 454r (e.g., for SC-FDM, etc.), and transmitted to the BS 110. At the BS 110, the UL signals from the UE 120 may be received by the antennas 434, processed by the MOD in transceivers 432, detected by a MIMO detector 436 if applicable, and further processed by a receive processor 438 to obtain decoded data and control information sent by the UE 120. The receive processor 438 may provide the decoded data to a data sink 439 and the decoded control information to the controller/processor 440.

The controllers/processors 440 and 480 may direct the operation at the BS 110a and the UE 120a, respectively. The processor 440 and/or other processors and modules at the BS 110a may perform or direct the execution of processes for the techniques described herein. The memories 442 and 482 may store data and program codes for the BS 110a and the UE 120a, respectively. A scheduler 444 may schedule UEs for data transmission on the DL and/or the UL.

Antennas 452, processors 466, 458, 464, and/or controller/processor 480 of the UE 120a and/or antennas 434, processors 420, 430, 438, and/or controller/processor 440 of the BS 110a may be used to perform various techniques and methods described herein. For example, as shown in FIG. 4, the controller/processor 440 of the BS 110a has a UAI manager 441 that may be configured to perform the operations illustrated in FIG. 9, as well as other operations disclosed herein. As shown in FIG. 4, the controller/processor 480 of the UE 120a has a UAI manager 481 that may be configured to perform the operations illustrated in FIG. 8, as well as other operations disclosed herein, in accordance with aspects of the present disclosure. Although shown at the controller/processor, other components of the UE 120a and the BS 110a may be used performing the operations described herein.

Figure 5:
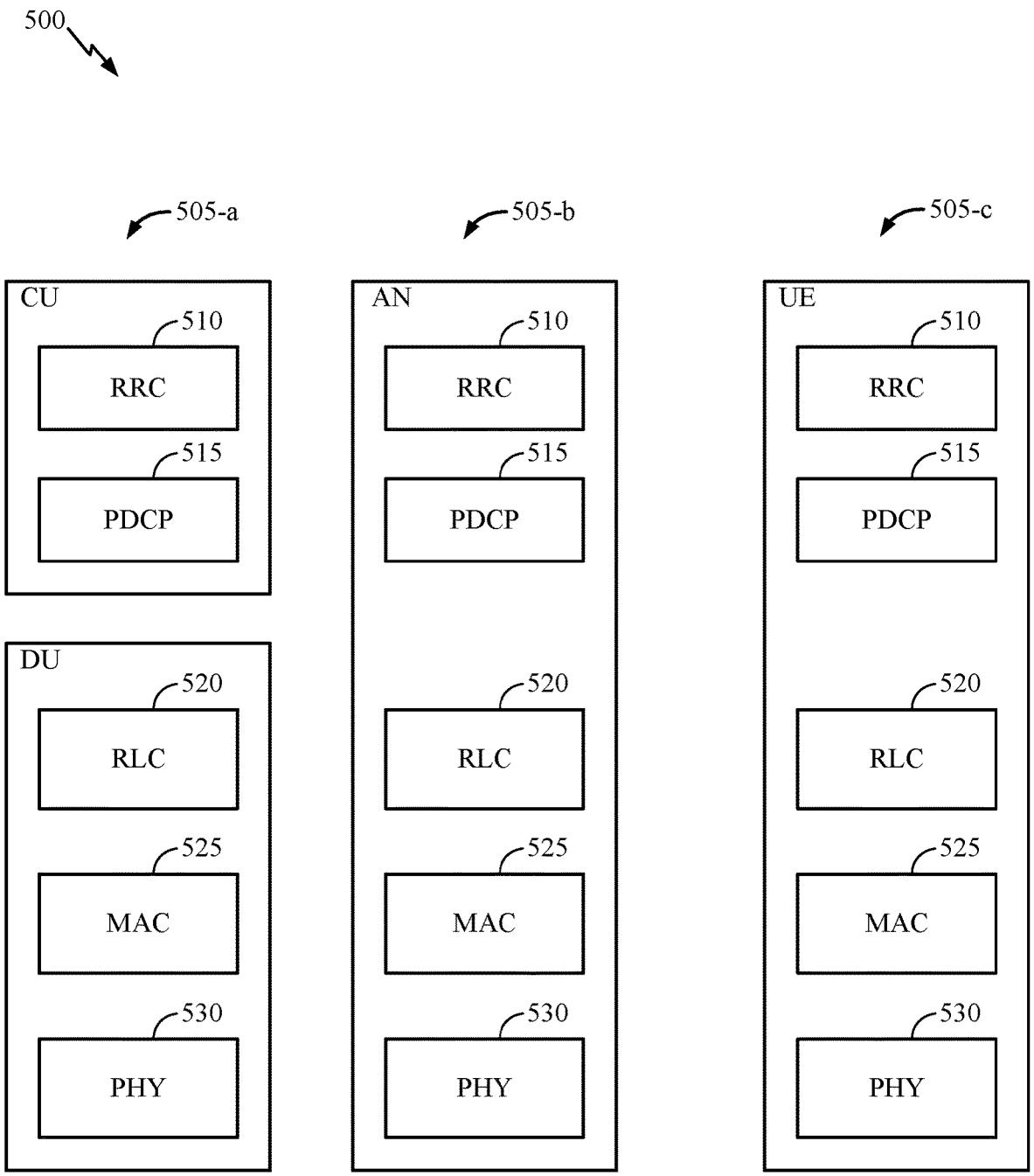
FIG. 5 is a diagram showing examples for implementing a communication protocol stack, in accordance with certain aspects of the present disclosure.

FIG. 5 illustrates a diagram 500 showing examples for implementing a communications protocol stack, according to aspects of the present disclosure. The illustrated communications protocol stacks may be implemented by devices operating in a wireless communication system, such as a 5G system (e.g., a system that supports uplink-based mobility). The diagram 500 illustrates a communications protocol stack including a radio resource control (RRC) layer 510, a packet data convergence protocol (PDCP) layer 515, a radio link control (RLC) layer 520, a medium access control (MAC) layer 525, and a physical (PHY) layer 530. In various examples, the layers of a protocol stack may be implemented as separate modules of software, portions of a processor or ASIC, portions of non-collocated devices connected by a communications link, or various combinations thereof. Collocated and non-collocated implementations may be used, for example, in a protocol stack for a network access device (e.g., ANs, CUs, and/or DUs) or a UE.

A first option 505-a shows a split implementation of a protocol stack, in which implementation of the protocol stack is split between a centralized network access device (e.g., an ANC 202 in FIG. 2) and distributed network access device (e.g., TRP 208 in FIG. 2). In the first option 505-a, an RRC layer 510 and a PDCP layer 515 may be implemented by the central unit, and an RLC layer 520, a MAC layer 525, and a PHY layer 530 may be implemented by the DU. In various examples the CU and the DU may be collocated or non-collocated. The first option 505-a may be useful in a macro cell, micro cell, or pico cell deployment.

A second option 505-b shows a unified implementation of a protocol stack, in which the protocol stack is implemented in a single network access device. In the second option, the RRC layer 510, the PDCP layer 515, the RLC layer 520, the MAC layer 525, and the PHY layer 530 may each be implemented by the AN. The second option 505-b may be useful in, for example, a femto cell deployment.

Regardless of whether a network access device implements part or all of a protocol stack, a UE may implement an entire protocol stack as shown in 505-c (e.g., the RRC layer 510, the PDCP layer 515, the RLC layer 520, the MAC layer 525, and the PHY layer 530).

In LTE, the basic transmission time interval (TTI) or packet duration is the 1 ms subframe. In the NR, a subframe is still 1 ms, but the basic TTI is referred to as a slot. A subframe contains a variable number of slots (e.g., 1, 2, 4, 8, 16, ... slots) depending on the subcarrier spacing. The NR RB is 12 consecutive frequency subcarriers. The NR may support a base subcarrier spacing of 15 KHz and other subcarrier spacing may be defined with respect to the base subcarrier spacing, for example, 30 kHz, 60 kHz, 120 kHz, 240 kHz, etc. The symbol and slot lengths scale with the subcarrier spacing. The CP length also depends on the subcarrier spacing.

Figure 6:
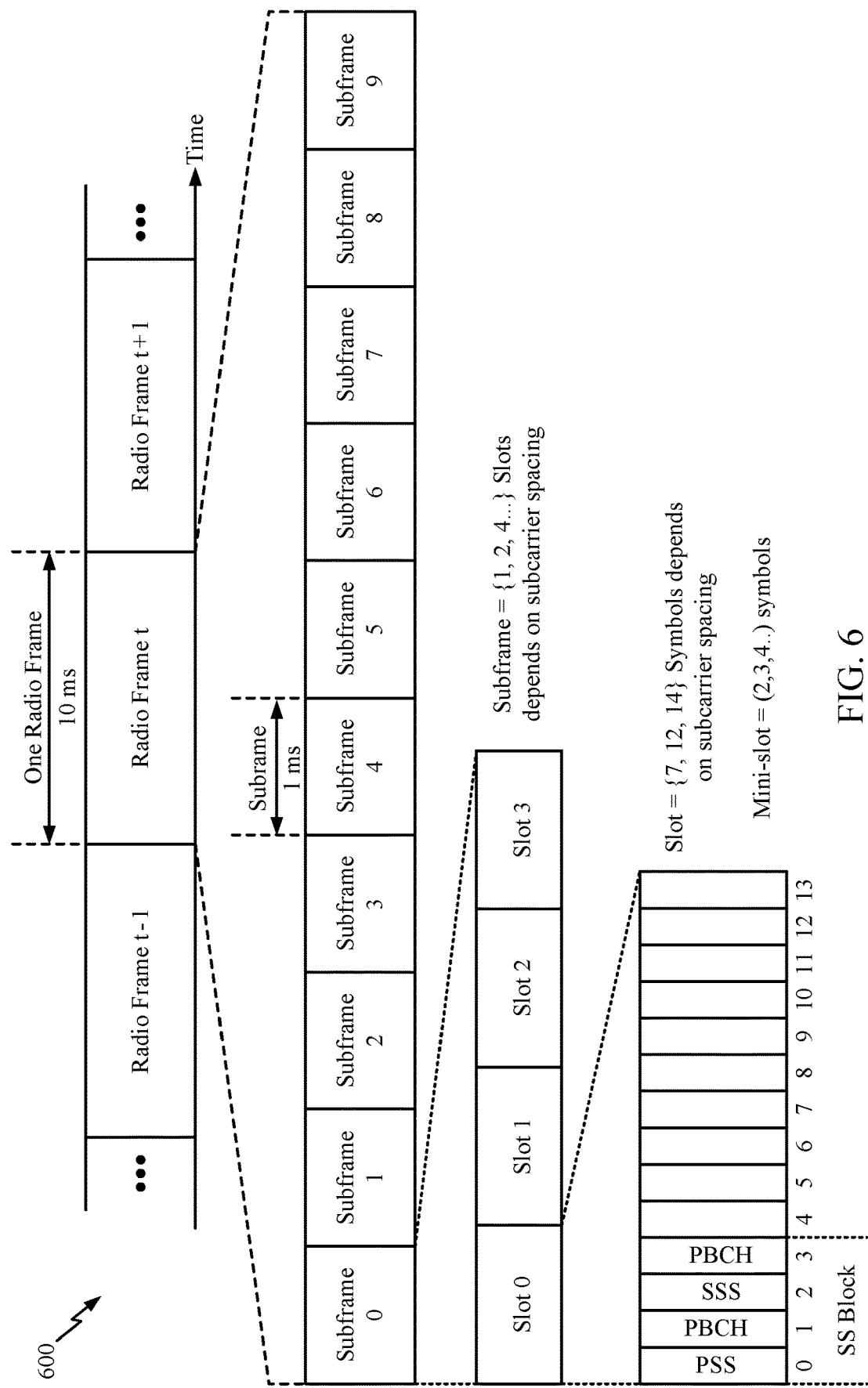
FIG. 6 illustrates an example of a frame format for a new radio (NR) system, in accordance with certain aspects of the present disclosure.

FIG. 6 is a diagram showing an example of a frame format 600 for NR. The transmission timeline for each of a DL and an UL may be partitioned into units of radio frames. Each radio frame may have a predetermined duration (e.g., 10 ms) and may be partitioned into 10 subframes, each of 1 ms, with indices of 0 through 9. Each subframe may include a variable number of slots depending on the subcarrier spacing. Each slot may include a variable number of symbol periods (e.g., 7, 12, or 14 symbols) depending on the subcarrier spacing. The symbol periods in each slot may be assigned indices. A mini-slot, which may be referred to as a sub-slot structure, refers to a transmit time interval having a duration less than a slot (e.g., 2, 3, or 4 symbols).

Each symbol in a slot may indicate a link direction (e.g., DL, UL, or flexible) for data transmission and the link direction for each subframe may be dynamically switched. The link directions may be based on the slot format. Each slot may include DL/UL data as well as DL/UL control information.

In NR, a synchronization signal (SS) block is transmitted. The SS block includes a PSS, a SSS, and a two symbol PBCH. The SS block can be transmitted in a fixed slot location, such as the symbols 0-3 as shown in FIG. 6. The PSS and SSS may be used by UEs for cell search and acquisition. The PSS may provide half-frame timing, the SS may provide the CP length and frame timing. The PSS and SSS may provide the cell identity. The PBCH carries some basic system information, such as DL system bandwidth, timing information within radio frame, SS burst set periodicity, system frame number, etc. The SS blocks may be organized into SS bursts to support beam sweeping. Further system information such as, remaining minimum system information (RMSI), system information blocks (SIBs), other system information (OSI) can be transmitted on a PDSCH in certain subframes.

In some circumstances, two or more subordinate entities (e.g., UEs) may communicate with each other using sidelink signals. Real-world applications of such sidelink communications may include public safety, proximity services, UE-to-network relaying, vehicle-to-vehicle (V2V) communications, Internet of Everything (IoE) communications, IoT communications, mission-critical mesh, and/or various other suitable applications. Generally, a sidelink signal may refer to a signal communicated from one subordinate entity (e.g., a UE1) to another subordinate entity (e.g., a UE2) without relaying that communication through the scheduling entity (e.g., a UE or a BS), even though the scheduling entity may be utilized for scheduling and/or control purposes. In some examples, the sidelink signals may be communicated using a licensed spectrum (unlike wireless local area networks, which typically use an unlicensed spectrum).

A UE may operate in various radio resource configurations, including a configuration associated with transmitting pilots using a dedicated set of resources (e.g., a RRC dedicated state, etc.) or a configuration associated with transmitting pilots using a common set of resources (e.g., an RRC common state, etc.). When operating in the RRC dedicated state, the UE may select a dedicated set of resources for transmitting a pilot signal to a network. When operating in the RRC common state, the UE may select a common set of resources for transmitting a pilot signal to the network. In either case, a pilot signal transmitted by the UE may be received by one or more network access devices, such as an AN, or a DU, or portions thereof. Each receiving network access device may be configured to receive and measure pilot signals transmitted on the common set of resources, and also receive and measure pilot signals transmitted on dedicated sets of resources allocated to the UEs for which the network access device is a member of a monitoring set of network access devices for the UE. One or more of the receiving network access devices, or a CU to which receiving network access device(s) transmit the measurements of the pilot signals, may use the measurements to identify serving cells for the UEs, or to initiate a change of serving cell for one or more of the UEs.

Example UE Assistance Information

Figure 7:
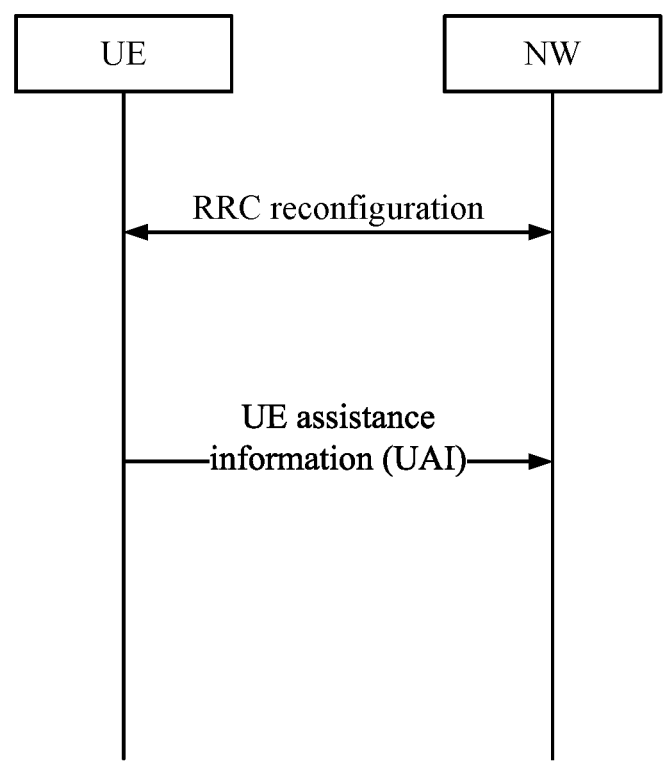
FIG. 7 is a call flow diagram illustrating an example of a UE providing assistance information, in accordance with certain aspects of the present disclosure.

In certain wireless communication systems (e.g., 5$^{th}$ generation (5G) new radio (NR)), a user equipment (UE) may be configured to provide UE assistance information (UAI) to a network, as shown in FIG. 7. The UAI may inform the network of various parameters, such as a UE delay budget report carrying desired increment/decrement in Uu air interface delay, connected mode discontinuous reception (DRX) cycle length, or overheating assistance information.

In some cases, the UE capable of providing delay budget reporting in a radio resource control (RRC) state such as a RRC_CONNECTED state may initiate a procedure of providing the UAI in several cases. For example, the UE may initiate the procedure upon being configured to provide the delay budget report and upon change of a delay budget preference. As another example, the UE capable of providing the overheating assistance information in the RRC_CONNECTED state may initiate the procedure if the UE was configured to do so, upon detecting internal overheating, or upon detecting that it the UE no longer experiencing an overheating condition.

Example UE Assistance Information in Multi-Radio Dual Connectivity Configurations In certain wireless communication systems (e.g., 5$^{th}$ generation (5G) new radio (NR)), a user equipment (UE) may be configured to communicate with multiple groups of cells, such as a master cell group (MCG) and a secondary cell group (SCG), which is referred to as dual connectivity. The dual connectivity may enable a network to provide more bandwidth to the UE depending on a resource budget allocated to each cell group. The MCG may be limited on its resource budget due to an influx of connected UEs. The network may configure one of the UEs for dual connectivity with the SCG to offload some of bandwidth consumed by the UE. In other cases, dual connectivity may enable the network to provide low latency radio bearers to the UE via one of the cell groups, such as the SCG, and allow other traffic to flow through the MCG.

Aspects of the present disclosure provide techniques for signaling UE assistance information (UAI) in various multiple radio dual connectivity (MR-DC) configurations. For example, the techniques described herein may be used in evolved UMTS terrestrial radio access network (E-UTRAN) new radio—dual connectivity (EN-DC) involving long term evolution (LTE) and new radio (NR) or NR-dual connectivity (NR-DC) (with two NR radios).

In NR-DC scenarios, each cell group may have its own radio resource control (RRC) entity, as well as a medium access control (MAC) entity. Conventionally, however, all uplink (UL) control signals are typically routed through the RRC entity in the MCG. For example, in NR Rel-15/16, in case the UE has overheating, the UE sends its overheating indication to the RRC entity of the MCG, which then decides how to reduce the UE radio resource configuration in the MCG and/or the SCG.

Aspects of the present disclosure provide apparatuses, methods, processing systems, and computer readable mediums for providing cell group (CG) specific UAI. For example, power saving related parameters may be signaled via CG specific UAI. Making power savings parameters CG specific in this manner (rather than per UE) makes sense, as power saving is more related to traffic activity and MAC layer configurations (e.g., a secondary cell (SCell) configuration).

Figure 8:
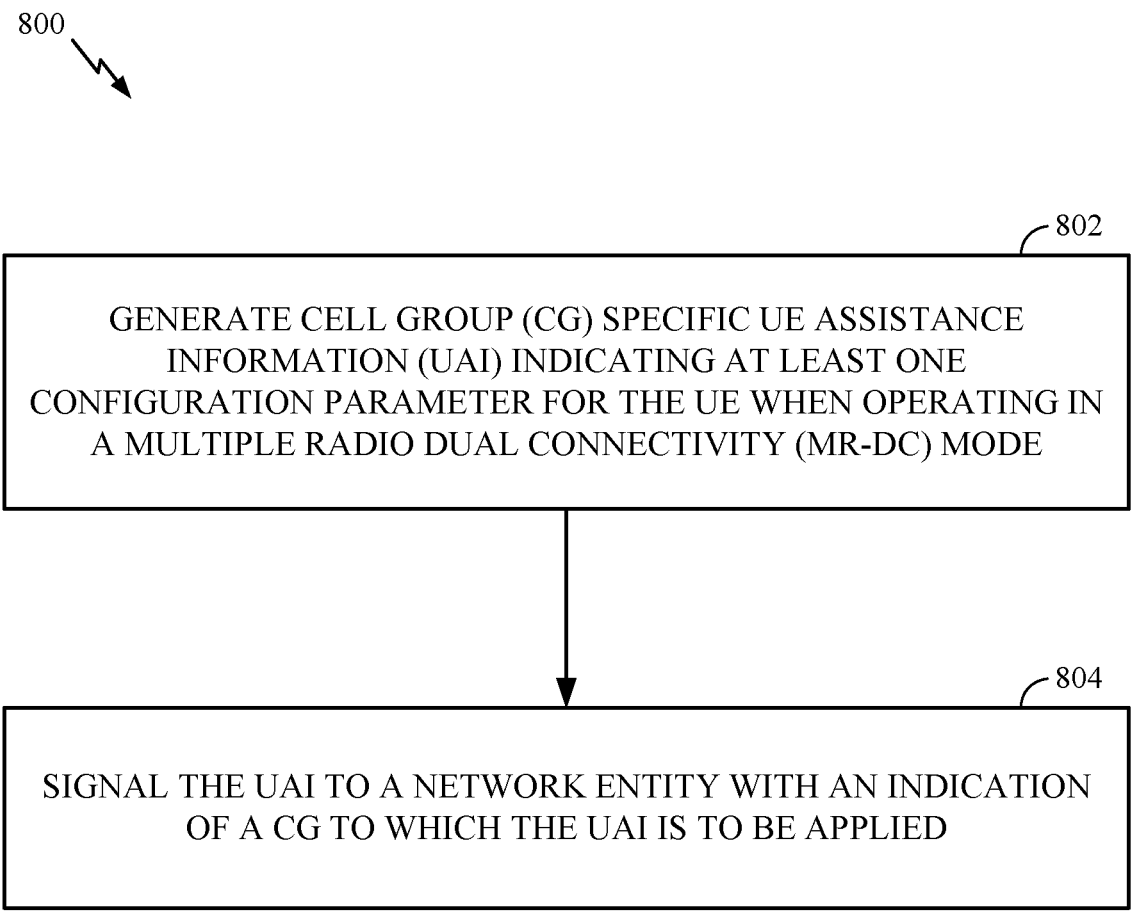
FIG. 8 illustrates example operations for wireless communications by a UE, in accordance with certain aspects of the present disclosure.

FIG. 8 is a flow diagram illustrating example operations 800 for wireless communication, in accordance with certain aspects of the present disclosure. The operations 800 may be performed, for example, by a UE (e.g., such as the UE 120a in the wireless communication network 100) for signaling UAI in a new radio—dual connectivity (NR-DC) scenario. The operations 800 may be implemented as software components that are executed and run on one or more processors (e.g., the controller/processor 480 of FIG. 4). Further, the transmission and reception of signals by the UE in operations 800 may be enabled, for example, by one or more antennas (e.g., the antennas 452 of FIG. 4). In certain aspects, the transmission and/or reception of signals by the UE may be implemented via a bus interface of one or more processors (e.g., the controller/processor 480) obtaining and/or outputting signals.

The operations 800 begin, at block 802, by generating CG specific UAI, indicating at least one configuration parameter for the UE when operating in a MR-DC mode. At 804, the UE signals the UE assistance information to a network entity, with an indication of a CG to which the UE assistance information is to be applied.

Figure 9:
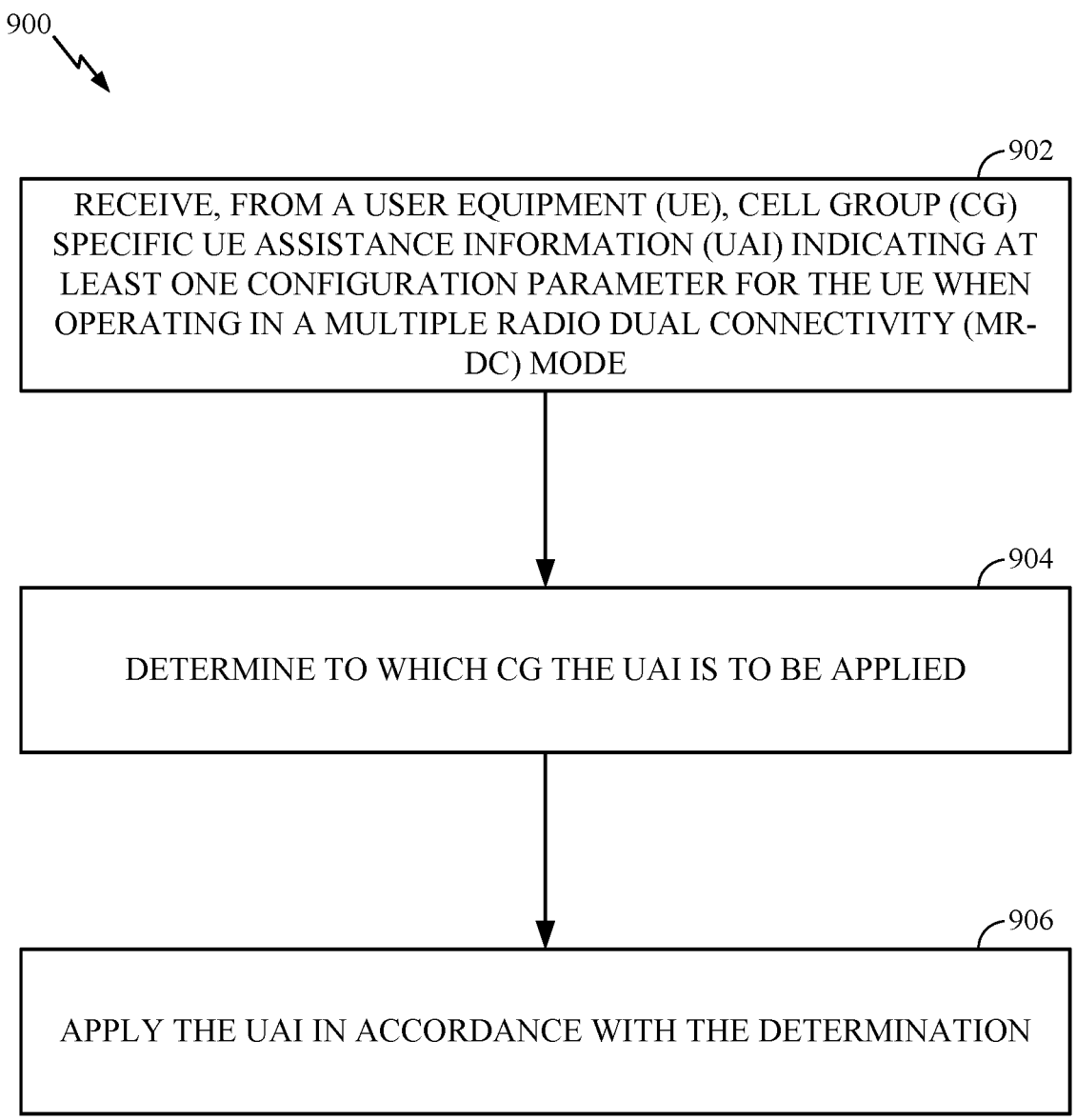
FIG. 9 illustrates example operations for wireless communications by a network entity, in accordance with certain aspects of the present disclosure.

FIG. 9 is a flow diagram illustrating example operations 900 that may be considered complementary to operations 800 of FIG. 8. For example, the operations 900 may be performed by a network entity (e.g., such as the BS 110a in the wireless communication network 100) to receive and process CG specific UAI (e.g., sent by the UE performing operations 800 of FIG. 8). The operations 900 may be complementary to the operations 800 performed by the UE. The operations 900 may be implemented as software components that are executed and run on one or more processors (e.g., the controller/processor 440 of FIG. 4). Further, the transmission and reception of signals by the BS in operations 900 may be enabled, for example, by one or more antennas (e.g., the antennas 434 of FIG. 4). In certain aspects, the transmission and/or reception of signals by the BS may be implemented via a bus interface of one or more processors (e.g., the controller/processor 440) obtaining and/or outputting signals.

The operations 900 begin, at 902, by receiving, from a UE, CG specific UAI, indicating at least one configuration parameter for the UE when operating in a MR-DC mode. At 904, the network entity determines to which CG the UAI is to be applied. At 906, the network entity applies the UAI in accordance with the determination.

As noted above, providing CG specific UAI may allow parameters to be updated for a particular CG (e.g., a MCG, a SCG, or both) rather than automatically applying the update on a UE-basis across all CGs.

One example, of CG specific UAI should include all power saving related parameters agreed for Rel-16. Such parameters include, for example, drx-Preference, maxBW-Preference, maxCC-Preference, maxMIMO-LayerPreference, and minSchedulingOffsetPreference. In such cases, however, it may be desirable that CG specific UAI for power saving does not include a UE request for SCG configuration and release or a UE request for RRC connection release.

Figure 10:
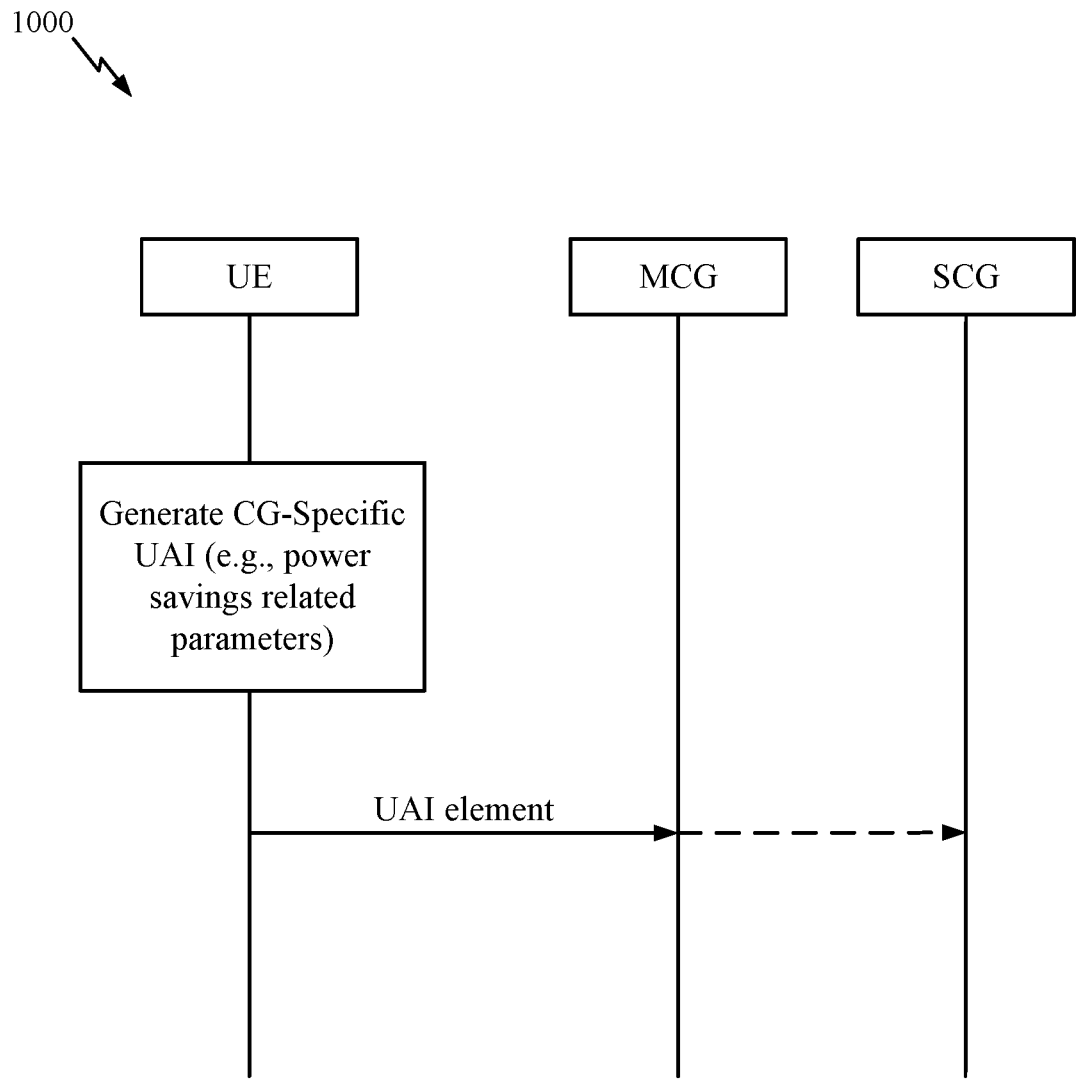
FIG. 10 is a call flow diagram illustrating an example of a UE providing assistance information, in accordance with certain aspects of the present disclosure.

As illustrated in FIG. 10, in some cases, CG-specific UAI (e.g., SCG-specific UAI) may be signaled to a MCG (via UAI information element using RRC entity), which may then forward the SCG-specific UAI to the SCG (RRC entity).

In some aspects, the CG specific UAI may be explicitly signaled. The particular signaling mechanism may, in some cases, depend on the type of MR-DC configuration.

For example, for EN-DC, a UAI information element or UAI of one radio access technology (RAT) may be extended to include CG-specific parameters. For example, an LTE UAI may be extended to include an optional new UAI information element, which contains parameters in an NR power saving UAI (such as the parameters listed above). For example, this UAI information element can be named as "UAI-NR-power_saving-v16xx" or something similar.

For NR-DC, a current UAI may be extended to include a new field, which indicates whether the power saving UAI information element in this UAI is for MCG, SCG or both.

In some aspects, depending on the type of DC configuration, the UE may choose to send either an enhanced LTE UAI (in case of EN-DC) or an enhanced NR UAI (in case of NR-DC) to the RRC entity in the MCG.

In some aspects, the CG specific UAI may be implicitly signaled, for example, based on a selection of resources used for the signaling or particular parameter values signaled.

According to a first option, a network may configure a particular signal radio bearer (e.g., SRB3) between UE and the RRC entity in SCG. In such cases, the UE may send UAIs specific to NR SCG over SRB3 to the RRC entity in SCG. In such cases, the UE may send other UAI (not specific to NR SCG) over a different SRB (e.g., SRB1/2) to RRC entity in MCG.

According to a second option, when the UE sends an SCG-specific UAI, the UE may send the UAI in a transparent container (e.g., transparent RRC container) to the RRC entity of the MCG. In such cases, when the MCG RRC entity receives the transparent RRC container, it may forward it to the SCG RRC entity for processing.

Both the first and second options may be applicable in either NR-DC or EN-DC MR-DC configurations.

Figure 11:
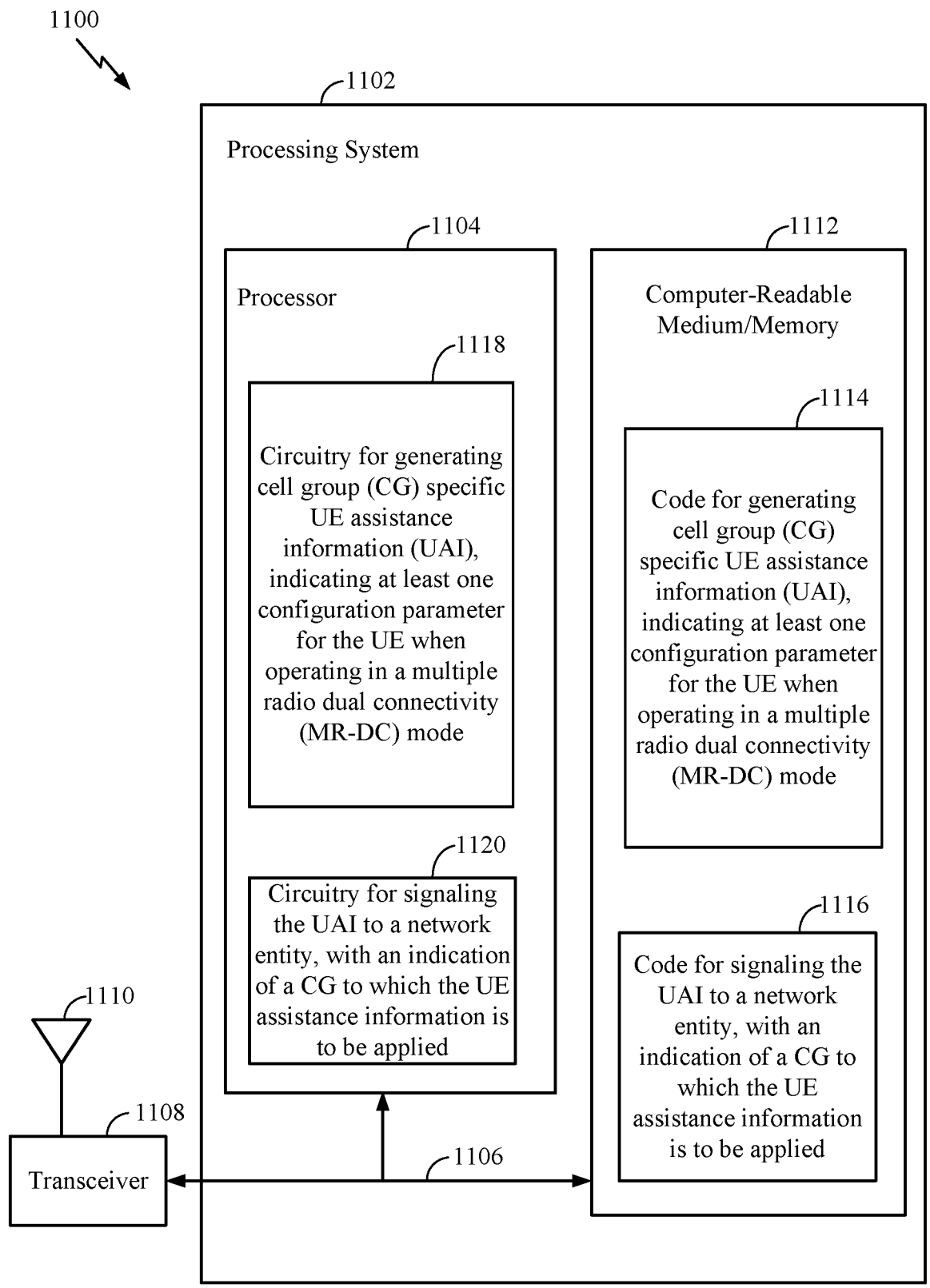
FIG. 11 illustrates a communications device that may include various components configured to perform operations for techniques disclosed herein, according to aspects of the present disclosure.

FIG. 11 illustrates a communications device 1100 that may include various components (e.g., corresponding to means-plus-function components) configured to perform operations for the techniques disclosed herein, such as the operations illustrated in FIG. 8. The communications device 1100 includes a processing system 1102 coupled to a transceiver 1108 (e.g., a transmitter and/or a receiver). The transceiver 1108 is configured to transmit and receive signals for the communications device 1100 via an antenna 1110, such as the various signals as described herein. The processing system 1102 is configured to perform processing functions for the communications device 1100, including processing signals received and/or to be transmitted by the communications device 1100.

The processing system 1102 includes a processor 1104 coupled to a computer-readable medium/memory 1112 via a bus 1106. In certain aspects, the computer-readable medium/memory 1112 is configured to store instructions (e.g., a computer-executable code) that when executed by the processor 1104, cause the processor 1104 to perform the operations illustrated in FIG. 8, or other operations for performing the various techniques discussed herein. In certain aspects, computer-readable medium/memory 1112 stores code 1114 for generating and code 1116 for signaling. The code 1114 for generating may include code for generating CG specific UAI indicating at least one configuration parameter for the UE when operating in a MR-DC mode. The code 1116 for signaling may include code for signaling the UAI to a network entity with an indication of a CG to which the UE assistance information is to be applied.

The processor 1104 may include circuitry configured to implement the code stored in the computer-readable medium/memory 1112, such as for performing the operations illustrated in FIG. 8, as well as other operations for performing the various techniques discussed herein. For example, the processor 1104 includes circuitry 1118 for generating and circuitry 1120 for signaling. The circuitry 1118 for generating may include circuitry for generating CG specific UAI indicating at least one configuration parameter for the UE when operating in a MR-DC mode. The circuitry 1120 for signaling may include circuitry for signaling the UAI to a network entity with an indication of a CG to which the UE assistance information is to be applied.

Figure 12:
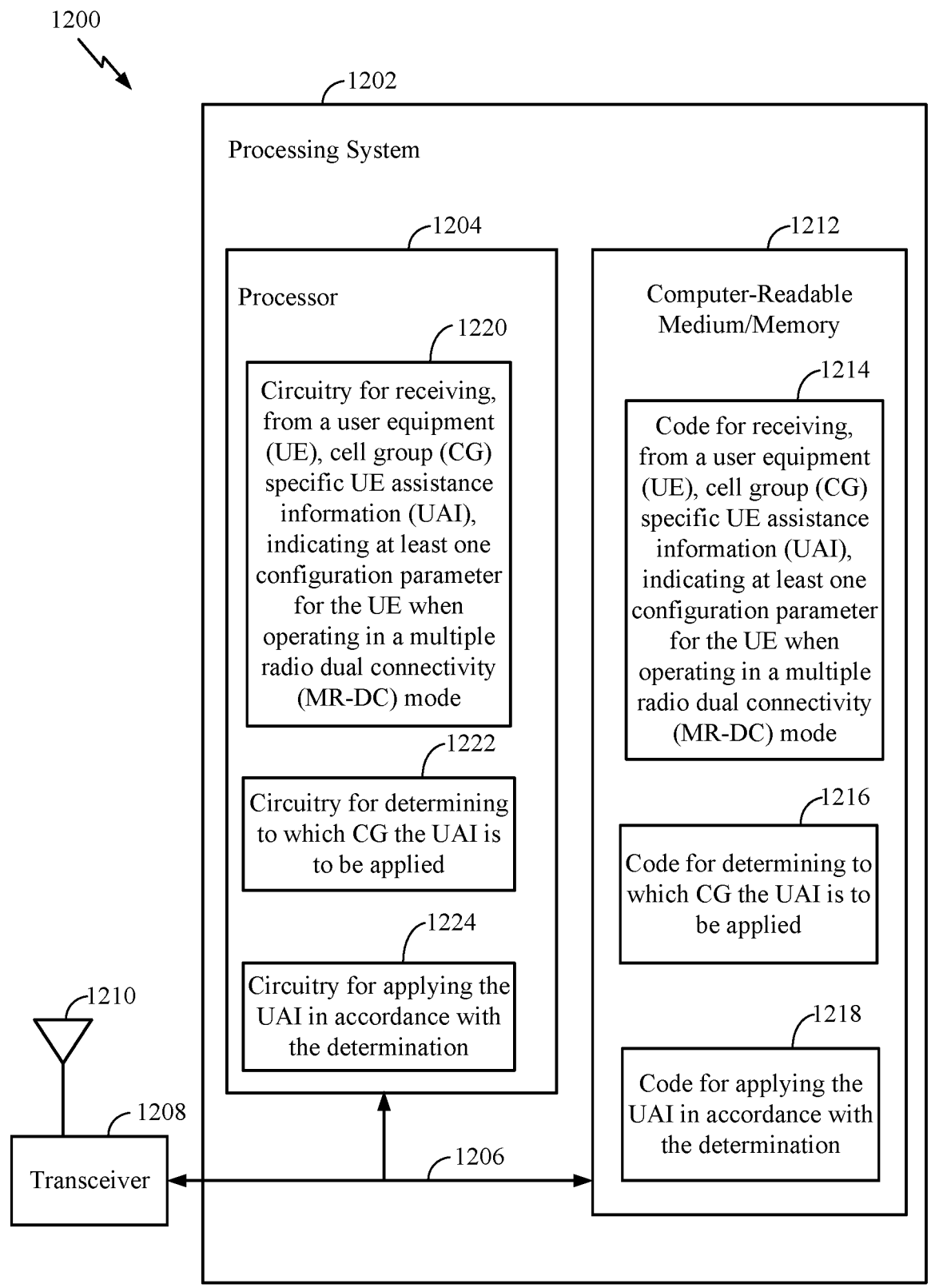
FIG. 12 illustrates a communications device that may include various components configured to perform operations for techniques disclosed herein, according to aspects of the present disclosure.

FIG. 12 illustrates a communications device 1200 that may include various components (e.g., corresponding to means-plus-function components) configured to perform operations for the techniques disclosed herein, such as the operations illustrated in FIG. 9. The communications device 1200 includes a processing system 1202 coupled to a transceiver 1208 (e.g., a transmitter and/or a receiver). The transceiver 1208 is configured to transmit and receive signals for the communications device 1200 via an antenna 1210, such as the various signals as described herein. The processing system 1202 is configured to perform processing functions for the communications device 1200, including processing signals received and/or to be transmitted by the communications device 1200.

The processing system 1202 includes a processor 1204 coupled to a computer-readable medium/memory 1212 via a bus 1206. In certain aspects, the computer-readable medium/memory 1212 is configured to store instructions (e.g., a computer-executable code) that when executed by the processor 1204, cause the processor 1204 to perform the operations illustrated in FIG. 9, or other operations for performing the various techniques discussed herein. In certain aspects, computer-readable medium/memory 1212 stores code 1214 for receiving, code 1216 for determining, and code 1218 for applying. The code 1214 for receiving may include code for receiving from a UE CG specific UAI indicating at least one configuration parameter for the UE when operating in a MR-DC mode. The code 1216 for determining may include code for determining to which CG the UAI is to be applied. The code 1218 for applying may include code for applying the UAI in accordance with the determination.

The processor 1204 may include circuitry configured to implement the code stored in the computer-readable medium/memory 1212, such as for performing the operations illustrated in FIG. 9, as well as other operations for performing the various techniques discussed herein. For example, the processor 1204 includes circuitry 1220 for receiving, circuitry 1222 for determining, and circuitry 1224 for applying. The circuitry 1220 for receiving may include circuitry for receiving from a UE CG specific UAI indicating at least one configuration parameter for the UE when operating in a MR-DC mode. The circuitry 1222 for determining may include circuitry for determining to which CG the UAI is to be applied. The circuitry 1224 for applying may include circuitry for applying the UAI in accordance with the determination.

Example Aspects

Implementation examples are described in the following numbered aspects.

In a first aspect, a method for wireless communications by a user equipment (UE), comprising: generating cell group (CG) specific UE assistance information (UAI), indicating at least one configuration parameter for the UE when operating in a multiple radio dual connectivity (MR-DC) mode; and signaling the UAI to a network entity, with an indication of a CG to which the UE assistance information is to be applied.

In a second aspect, alone or in combination with the first aspect, the UAI indicates one or more power saving related parameters.

In a third aspect, alone or in combination with one or more of the first and second aspects, the one or more power saving related parameters comprise a preference regarding at least one of: discontinuous reception (DRX), a maximum aggregated bandwidth (BW), a maximum number of component carriers (CCs), a maximum number of multiple input multiple output (MIMO) layers, or a minimum scheduling offset.

In a fourth aspect, alone or in combination with one or more of the first through third aspects, the MR-DC mode involves at least a first radio access technology (RAT) and a second RAT; the UE assistance information is to be applied to a CG involving the second RAT; and the UE assistance information is signaled via a UAI information element of the first RAT.

In a fifth aspect, alone or in combination with one or more of the first through fourth aspects, the MR-DC mode involves at least a master CG (MCG) and a secondary CG (SCG) of a common radio access technology (RAT); and the UE assistance information is signaled via a UAI information element that includes a field that indicates whether the UAI is to be applied to the MCG, the SCG, or both.

In a sixth aspect, alone or in combination with one or more of the first through fifth aspects, the MR-DC mode involves at least a master CG (MCG) and a secondary CG (SCG); and the UE signals the UAI specific to the SCG via a first signal radio bearer.

In a seventh aspect, alone or in combination with one or more of the first through sixth aspects, the first signal radio bearer is established between the UE and a radio resource control (RRC) entity in the SCG.

In an eighth aspect, alone or in combination with one or more of the first through seventh aspects, the UE signals other UAI that is not specific to the SCG via a second signal radio bearer established between the UE and an RRC entity in the MCG.

In a ninth aspect, alone or in combination with one or more of the first through eighth aspects, wherein the MR-DC mode involves at least a master CG (MCG) and a secondary CG (SCG); and the UE signals the UAI specific to the SCG via a transparent container.

In a tenth aspect, alone or in combination with one or more of the first through ninth aspects, the transparent container corresponds to a transparent radio resource control (RRC) container, and wherein the UE sends the transparent RRC container to an RRC entity in the MCG.

In an eleventh aspect, a method for wireless communications by a network entity, comprising: receiving, from a user equipment (UE), cell group (CG) specific UE assistance information (UAI), indicating at least one configuration parameter for the UE when operating in a multiple radio dual connectivity (MR-DC) mode; determining to which CG the UAI is to be applied; and applying the UAI in accordance with the determination.

In a twelfth aspect, alone or in combination with the eleventh aspect, the UAI indicates one or more power saving related parameters.

In a thirteenth aspect, alone or in combination with one or more of the eleventh and twelfth aspects, the one or more power saving related parameters comprise a preference regarding at least one of: discontinuous reception (DRX), a maximum aggregated bandwidth (BW), a maximum number of component carriers (CCs), a maximum number of multiple input multiple output (MIMO) layers, or a minimum scheduling offset.

In a fourteenth aspect, alone or in combination with one or more of the eleventh through thirteenth aspects, the MR-DC mode involves at least a first radio access technology (RAT) and a second RAT; the UAI is to be applied to a CG involving the second RAT; and the UAI is signaled via a UE assistance information element (IE) of the first RAT.

In a fifteenth aspect, alone or in combination with one or more of the eleventh through fourteenth aspects, the MR-DC mode involves at least a master CG (MCG) and a secondary CG (SCG) of a common radio access technology (RAT); and the UAI is signaled via a UAI information element that includes a field that indicates whether the UAI is to be applied to the MCG, the SCG, or both.

In a sixteenth aspect, alone or in combination with one or more of the eleventh through sixteenth aspects, the MR-DC mode involves at least a master CG (MCG) and a secondary CG (SCG); and the UE signals the UAI specific to the SCG via a first signal radio bearer.

In a seventeenth aspect, alone or in combination with one or more of the eleventh through sixteenth aspects, the first signal radio bearer is established between the UE and a radio resource control (RRC) entity in the SCG.

In an eighteenth aspect, alone or in combination with one or more of the eleventh through seventeenth aspects, the UE signals other UAI that is not specific to the SCG via a second signal radio bearer established between the UE and an RRC entity in the MCG.

In a nineteenth aspect, alone or in combination with one or more of the eleventh through eighteenth aspects, the MR-DC mode involves at least a master CG (MCG) and a secondary CG (SCG); and the UE signals the UAI specific to the SCG via a transparent container.

In a twentieth aspect, alone or in combination with one or more of the eleventh through nineteenth aspects, the transparent container corresponds to a transparent radio resource control (RRC) container; the UE sends the transparent RRC container to an RRC entity in the MCG; and the RRC entity in the MCG forwards the UAI to an RRC entity in the SCG for processing.

An apparatus for wireless communication, comprising at least one processor; and a memory coupled to the at least one processor, the memory comprising code executable by the at least one processor to cause the apparatus to perform the method of any of the first through twentieth aspects.

An apparatus comprising means for performing the method of any of the first through twentieth aspects.

A computer readable medium storing computer executable code thereon for wireless communications that, when executed by at least one processor, cause an apparatus to perform the method of any of the first through twentieth aspects.

Additional Considerations

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing, allocating, and the like.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user equipment (UE) 120 (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein, for example, instructions for performing the operations described herein and illustrated in FIGS. 8 and 9.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

The invention claimed is:

1. A method for wireless communications by a user equipment (UE), comprising:
generating cell group (CG) specific UE assistance information (UAI), indicating at least one configuration parameter comprising a preference for a length of a discontinuous reception (DRX) mode for the UE when operating in a multiple radio dual connectivity (MR-DC) mode involving at least a master CG (MCG) of a radio access technology (RAT) and a secondary CG (SCG) of the RAT; and
signaling the UAI to a network entity, with an indication of whether the UAI is to be applied to the MCG, the SCG, or both.

2. The method of claim 1, wherein the UAI indicates one or more power saving related parameters.

3. The method of claim 2, wherein the one or more power saving related parameters comprise a preference regarding at least one of:
a maximum aggregated bandwidth (BW), a maximum number of component carriers (CCs), a maximum number of multiple input multiple output (MIMO) layers, or a minimum scheduling offset.

4. The method of claim 1, wherein:
the MR-DC mode involves at least a first radio access technology (RAT) and a second RAT;
the UAI is to be applied to a CG involving the second RAT; and
the UAI is signaled via a UAI information element of the first RAT.

5. The method of claim 1, wherein:
the RAT corresponds to a new radio (NR); and
the UAI is signaled via a UAI information element that includes a field that indicates whether the UAI is to be applied to the MCG, the SCG, or both.

6. The method of claim 1, wherein:
the UE signals the UAI specific to the SCG via a first signal radio bearer.

7. The method of claim 6, wherein the first signal radio bearer is established between the UE and a radio resource control (RRC) entity in the SCG.

8. The method of claim 7, wherein the UE signals other UAI that is not specific to the SCG via a second signal radio bearer established between the UE and an RRC entity in the MCG.

9. The method of claim 1, wherein:
the UE signals the UAI specific to the SCG via a transparent container.

10. The method of claim 9, wherein the transparent container corresponds to a transparent radio resource control (RRC) container, and wherein the UE sends the transparent RRC container to an RRC entity in the MCG.

11. A method for wireless communications by a network entity, comprising:
receiving, from a user equipment (UE), cell group (CG) specific UE assistance information (UAI), indicating at least one configuration parameter comprising a preference for a length of a discontinuous reception (DRX) mode for the UE when operating in a multiple radio dual connectivity (MR-DC) mode involving at least a master CG (MCG) of a radio access technology (RAT) and a secondary CG (SCG) of the RAT;
determining to which CG the UAI is to be applied based on the at least one configuration parameter indicating whether the UAI is to be applied to the MCG, the SCG, or both; and
applying the UAI in accordance with the determination.

12. The method of claim 11, wherein the UAI indicates one or more power saving related parameters.

13. The method of claim 12, wherein the one or more power saving related parameters comprise a preference regarding at least one of:
a maximum aggregated bandwidth (BW), a maximum number of component carriers (CCs), a maximum number of multiple input multiple output (MIMO) layers, or a minimum scheduling offset.

14. The method of claim 11, wherein:
the MR-DC mode involves at least a first radio access technology (RAT) and a second RAT;
the UAI is to be applied to a CG involving the second RAT; and
the UAI is signaled via a UE assistance information element (IE) of the first RAT.

15. The method of claim 11, wherein:
the RAT corresponds to a new radio (NR); and
the UAI is signaled via a UAI information element that includes a field that indicates whether the UAI is to be applied to the MCG, the SCG, or both.

16. The method of claim 11, wherein:
the UE signals the UAI specific to the SCG via a first signal radio bearer.

17. The method of claim 16, wherein the first signal radio bearer is established between the UE and a radio resource control (RRC) entity in the SCG.

18. The method of claim 17, wherein the UE signals other UAI that is not specific to the SCG via a second signal radio bearer established between the UE and an RRC entity in the MCG.

19. The method of claim 11, wherein:
the UE signals the UAI specific to the SCG via a transparent container.

20. The method of claim 19, wherein:
the transparent container corresponds to a transparent radio resource control (RRC) container;
the UE sends the transparent RRC container to an RRC entity in the MCG; and
the RRC entity in the MCG forwards the UAI to an RRC entity in the SCG for processing.

21. An apparatus for wireless communications by a user equipment (UE), comprising:
a memory comprising instructions; and
a processor configured to execute the instructions and cause the UE to:
generate cell group (CG) specific UE assistance information (UAI), indicating at least one configuration parameter comprising a preference for a length of a discontinuous reception (DRX) mode for the UE when operating in a multiple radio dual connectivity (MR-DC) mode involving at least a master CG (MCG) of a radio access technology (RAT) and a secondary CG (SCG) of the RAT; and
signal the UAI to a network entity, with an indication of whether the UAI is to be applied to the MCG, the SCG, or both.

22. The apparatus of claim 21, wherein the processor is further configured to execute the instructions and cause the UE to:
signal the UAI specific to the SCG via a first signal radio bearer.

23. The apparatus of claim 22, wherein the processor is further configured to execute the instructions and cause the UE to establish the first signal radio bearer between the UE and a radio resource control (RRC) entity in the SCG.

24. The apparatus of claim 21, wherein the processor is further configured to execute the instructions and cause the UE to:
signal the UAI specific to the SCG via a transparent container.

25. The apparatus of claim 24, wherein the transparent container corresponds to a transparent radio resource control (RRC) container, and wherein the processor is further configured to execute the instructions and cause the UE to send the transparent RRC container to an RRC entity in the MCG.

26. An apparatus for wireless communications by a network entity, comprising:
a memory comprising instructions; and
a processor configured to execute the instructions and cause the network entity to:
receive, from a user equipment (UE), cell group (CG) specific UE assistance information (UAI), indicating at least one configuration parameter comprising a preference for a length of a discontinuous reception (DRX) mode for the UE when operating in a multiple radio dual connectivity (MR-DC) mode involving at least a master CG (MCG) of a radio access technology (RAT) and a secondary CG (SCG) of the RAT;
determine to which CG the UAI is to be applied based on the at least one configuration parameter indicating whether the UAI is to be applied to the MCG, the SCG, or both; and
apply the UAI in accordance with the determination.

* * * * *